Howard & Reeder,
Windlass.
No. 99,900. Patented Feb. 15, 1870.
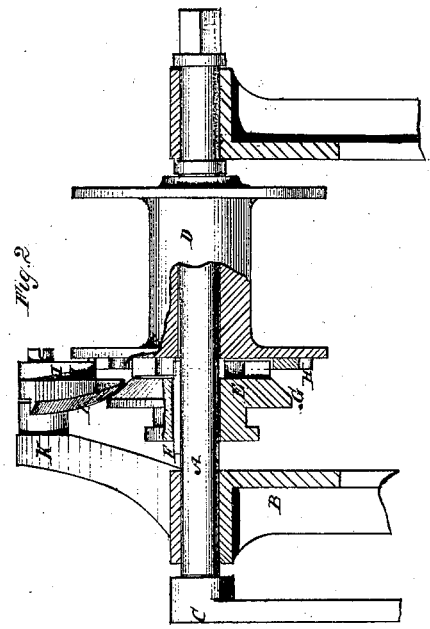
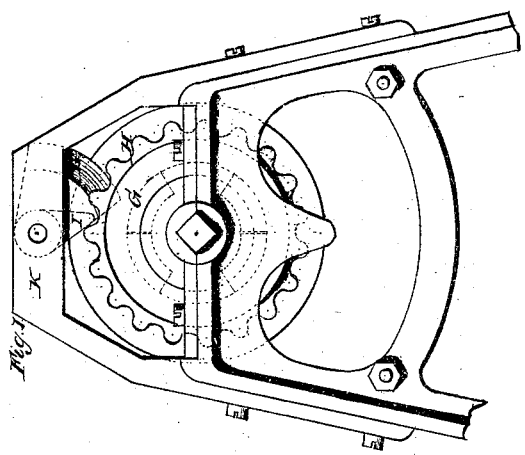
Witnesses:
Inventor:
W. S. Howard
C. Reeder
Per Munn & Co
Attorneys.

United States Patent Office.

W. T. HOWARD AND OLIVER REEDER, OF BALTIMORE, MD., ASSIGNORS TO OLIVER REEDER AND SAMUEL R. WAITE, OF SAME PLACE.

IMPROVED OYSTER-DREDGE WINDLASS.

Specification forming part of Letters Patent No. 99,900, dated February 15, 1870.

*To all whom it may concern:*

Be it known that we, W. T. HOWARD and O. REEDER, of Baltimore, in the county of Baltimore and State of Maryland, have invented a new and useful Improvement in Oyster-Dredge Winders; and we do hereby declare that the following is a full, clear, and exact description thereof, which will enable others skilled in the art to make and use the same, reference being had to the accompanying drawings, forming part of this specification.

This invention relates to improvements in machinery for winding or raising oyster-dredges; and it consists in the combination, with the loose drum and sliding clutch for communicating the motion of the driving-shaft to it, of a pawl and segmental disk of peculiar construction, and a ratchet or toothed wheel, under an arrangement whereby the clutch will be instantly thrown out of gear with the drum when the dredge catches on rocks or other obstructions as the vessel by which it is dragged moves along. The object of the said arrangement is to relieve the operators, who turn these drums by hand, from the danger of injury by the hand-cranks being suddenly reversed in motion and rapidly revolved when the dredges are fouled.

Figure 1 is an end elevation of our improved attachment, and Fig. 2 is a sectional elevation.

Similar letters of reference indicate corresponding parts.

A is the winding shaft, mounted on the vessel-frame B, and provided with hand-crank c for turning it.

D is the drum, arranged on the shaft A to turn loosely when not engaged by the clutch-disk E, which slides to and from the drum on a spline, F, which imparts rotary motion to it. This clutch is provided with a bevel or conical faced disk, G, fronting the ends of the drum, which carries a toothed disk, H.

I is a pawl pivoted above the toothed wheel or disk H on any suitable support, K. This pawl carries a segmental bevel-faced disk, L, of a greater radius than that of the pawl, which is of such length that it will oscillate from side to side of the vertical line of its axis, in combination with the teeth of the disk H, without obstructing it. The segmental disk L is so arranged with this pawl and the disk G of the clutch that in passing across this line it will crowd the clutch out of connection with the drum and leave the latter free to turn on the shaft. The clutch being engaged with the drum and the latter turned for winding up to right, as represented in Fig. 1, the teeth of the disk H will ride under the pawl; but if the chain or dredge is caught, so as to reverse the motion of the drum, (the vessel being in motion,) the pawl I will be carried back to the left, forcing the segmental wedge-disk L against the disk G of the clutch, throwing it out of gear with the drum, and the latter will be free to revolve without carrying the cranks out of the hands of the operators.

We may attach this apparatus to winders now in use by attaching the support K to the frames B, as represented in the drawings, and applying the disk H to the drum and G to the clutch in any suitable way.

Having thus described our invention, we claim as new and desire to secure by Letters Patent—

1. The combination, with the drum and sliding clutch E, of the toothed disk H, pawl I, segmental disk L, and bevel-faced disk A, all arranged for operation substantially as specified.

2. The combination, with the frame A, of the support K for the segmental disk L, all substantially as specified.

The above specification of our invention signed by us this 10th day of November, 1869.

W. T. HOWARD.
OLIVER REEDER.

Witnesses:
THOS. M. NORRIS,
H. WELLES RUSK.